United States Patent
Fryfogle et al.

(10) Patent No.: US 11,267,976 B2
(45) Date of Patent: Mar. 8, 2022

(54) SOLVENT STABLE SLIP ADDITIVE COMPOSITION

(71) Applicant: Dow Silicones Corporation, Midland, MI (US)

(72) Inventors: Patrick J. Fryfogle, Midland, MI (US); Yihan Liu, Midland, MI (US); Timothy P. Mitchell, Clio, MI (US); Jennifer A. Reil, Midland, MI (US); Michael R. Reiter, Midland, MI (US); John Roberts, Midland, MI (US); Gary M. Wieber, Midland, MI (US); Brett L. Zimmerman, Frankenmuth, MI (US)

(73) Assignee: Dow Silicones Corporation, Midland, MI (US)

( * ) Notice: Subject to any disclaimer, the term of this patent is extended or adjusted under 35 U.S.C. 154(b) by 0 days.

(21) Appl. No.: 17/427,982

(22) PCT Filed: Apr. 16, 2020

(86) PCT No.: PCT/US2020/028447
§ 371 (c)(1),
(2) Date: Aug. 3, 2021

(87) PCT Pub. No.: WO2020/219329
PCT Pub. Date: Oct. 29, 2020

(65) Prior Publication Data
US 2022/0041872 A1    Feb. 10, 2022

Related U.S. Application Data

(60) Provisional application No. 62/838,354, filed on Apr. 25, 2019.

(51) Int. Cl.
  *C09D 7/65* (2018.01)
  *C09D 7/20* (2018.01)
  *C09D 175/04* (2006.01)

(52) U.S. Cl.
  CPC ............. *C09D 7/65* (2018.01); *C09D 7/20* (2018.01); *C09D 175/04* (2013.01)

(58) Field of Classification Search
  CPC ............ C09D 7/65; C09D 7/20; C09D 175/04
  USPC ........................................................ 524/538
  See application file for complete search history.

(56) References Cited

U.S. PATENT DOCUMENTS

| | | | |
|---|---|---|---|
| 2,676,182 A | 4/1954 | Daudt et al. | |
| 3,627,851 A | 12/1971 | Brady | |
| 3,772,247 A | 11/1973 | Flannigan | |
| 4,125,470 A | 11/1978 | Fenton et al. | |
| 4,961,877 A * | 10/1990 | Shimizu | B01D 19/0409 516/118 |
| 5,548,053 A | 8/1996 | Weidner et al. | |
| 8,017,712 B2 | 9/2011 | Berry et al. | |
| 8,877,293 B2 | 11/2014 | Evan et al. | |
| 2011/0207650 A1* | 8/2011 | Rautschek | B01D 19/0404 510/405 |
| 2013/0122204 A1* | 5/2013 | Evans | C08J 3/05 427/372.2 |
| 2017/0204266 A1* | 7/2017 | Kennedy | A61K 8/894 |

FOREIGN PATENT DOCUMENTS

WO    2016014609    1/2016

OTHER PUBLICATIONS

Smith, A. Lee, The Analytical Chemistry of Silicones, ed., John Wiley & Sons: New York, 1991, p. 347.

* cited by examiner

*Primary Examiner* — Kelechi C Egwim
(74) *Attorney, Agent, or Firm* — Steven W. Mork

(57) ABSTRACT

A composition contains a polyorganosiloxane dispersed in a combination of a condensation product of a polysiloxane resin and a polyoxyalkylene polymer, and a non-aqueous fluid carrier; wherein the weight-ratio of non-aqueous fluid carrier to condensation product is 0.5 or more and 10 or less; the weight-ratio of the combination of condensation product and non-aqueous fluid carrier to polyorganosiloxane is 0.01 or more and 0.50 or less; and wherein the composition contains less than one weight-part aromatic solvent per million weight parts composition.

13 Claims, No Drawings

SOLVENT STABLE SLIP ADDITIVE COMPOSITION

BACKGROUND OF THE INVENTION

Field of the Invention

The present invention relates to a composition comprising a polyorganosiloxane dispersed in non-aqueous fluid containing a condensation reaction product of a polysiloxane resin and a polyoxyalkylene polymer. The composition is useful as a solvent stable slip additive.

INTRODUCTION

Slip additives are commonly used in coatings to provide mar resistance properties to the coating. Slip aids reduce the coefficient of friction between objects and the surface of a coating. A lower coefficient of friction between an object sliding over the surface of a coating desirably enable the object to slide more freely over the surface resulting in less undesirable effects such as marring and squeaking.

Slip additives desirably are stable in aqueous coating formulations, and more desirably are also stable in the presence of organic solvents such as coalescing aids that are often present in coating formulations. If a slip additive is not stable in a coating formulation phase separation occurs, causing loss of formulation homogeneity. Homogeneity is necessary for an attractive coating.

There is a movement to reduce aromatic solvents from coating formulations. Aromatic solvents such as benzene, ethyl benzene, toluene and xylene are often used in synthesizing organic and silicone compounds and are carried over to resulting coating formulations. Aromatic solvents are desirable to enhance solubility of components, drive out water during drying of a coating and to induce coalescence of coating components. However, the industry would like to reduce the use of aromatic solvents for environmental reasons. Removing aromatic solvents from slip additive compositions once they are present is not easy. Therefore, reducing the amount of aromatic solvent in a slip additive requires identifying how to form the slip additive with little or no aromatic solvent.

A slip additive that is stable in an aqueous coating formulation and in the presence of organic solvents while at the same time contains less than one weight part aromatic solvent per million weight parts slip additive would advance the art and be desirable to the coating industry.

BRIEF SUMMARY OF THE INVENTION

The present invention provides a slip additive that is stable in an aqueous coating formulation and in the presence of organic solvents while at the same time contains less than one weight part aromatic solvent per million weight parts slip additive.

The present invention is a result of surprisingly discovering that: (a) a polyoxyalkylene functionalized MQ resin surfactant system can be prepared that contains less than 5 weight parts aromatic solvent per million weight parts polyoxyalkylene functionalized MQ resin reaction product; and (b) such a polyoxyalkylene functionalized MQ resin surfactant system can suitably disperse polyorganosiloxane gum to particle sizes of 0.5 to 20 micrometers to form a slip additive composition that is stable in the presence of water and organic solvent and that contains less than one weight part aromatic solvent per million weight parts composition.

The present invention can further be free of tin compounds. The polyoxyalkylene functionalized MQ resin surfactant is made by a condensation reaction. Tin catalysts are common in condensation reactions, but are undesirable in final coatings. The condensation reaction of the present invention that is used to prepare the polyoxyalkylene functionalized MQ resin surfactant system can be run in an absence of tin catalysts to produce a slip additive that is free of tin catalysts.

In a first aspect, the present invention is a composition comprising a dispersion comprising: (a) a polyorganosiloxane comprising at least 90 mole-percent dimethyl D units and having a viscosity of 1,000,000 centipoise or more at 25 degrees Celsius, the polyorganosiloxane being in the form of particles having an average size of 0.5 to 20 micrometers; (b) a condensation product of: (i) a polysiloxane resin having a weight-average molecular weight of 4,000-50,000 and having the following composition: $(R_3SiO_{1/2})_a(SiO_{4/2})_b(ZO_{1/2})_c$ where subscripts a, b and c refer to the average molar ratio of the group associated with the subscript relative to total moles of silicon atoms in the molecule, subscript a is 0.30-0.60, subscript b is 0.40-0.70, subscript c is 0.05-0.20, the sum of subscripts a, b and c is one, R is independently in each occurrence selected from a group consisting of hydrogen, alkyl and aryl groups containing 1-30 carbon atoms, and Z is independently in each occurrence selected from a group consisting of H, and $C_1$-$C_8$ alkyls; and (ii) a polyoxyalkylene polymer having a number average molecular weight of 4,500 Daltons or more and at the same time 50,000 Daltons or less and having the following composition: $A-O-(C_2H_4O)_e(C_3H_6O)_p-A'$ where subscripts e and p are the average number of $(C_2H_4O)$ and $(C_3H_6O)$ groups in the molecule respectively and the ratio e/p is greater than one and less than 9, A and A' are independently selected from a group consisting of hydrogen, alkyl, substituted alkyl, aryl, and substituted aryl groups provided that at least one of A and A' is H; and (c) a non-aqueous fluid carrier that is miscible with the polyoxyalkylene polymer; where the weight-ratio of non-aqueous fluid carrier (c) to condensation product (b) is 0.5 or more and 10 or less; the weight-ratio of the combination of condensation product (b) and non-aqueous fluid carrier (c) to polyorganosiloxane (a) is 0.01 or more and 0.50 or less; and the composition contains less than one weight-part aromatic solvent per million weight parts composition.

In a second aspect, the present invention is a method for preparing the composition of the first aspect, the method comprising the steps of: (a) preparing a condensation product by conducting a condensation reaction in a reaction solvent between: (i) a polysiloxane resin having a weight-average molecular weight of 4,000-50,000 and having the following composition: $(R_3SiO_{1/2})_a(SiO_{4/2})_b(ZO_{1/2})_c$ where subscripts a, b and c refer to the average molar ratios of the group associated with the subscript relative to total moles of silicon atoms in the molecule, subscript a is 0.30-0.60, subscript b is 0.40-0.70, subscript c is 0.05-0.20, the sum of subscripts a and b is one, R in each occurrence is selected from a group consisting of hydrogen, alkyl and aryl groups containing 1-30 carbon atoms, and Z is in each occurrence selected from a group consisting of H, and $C_1$-$C_8$ alkyls; and (ii) a polyoxyalkylene polymer having a number average molecular weight of 4,500 Daltons or more and at the same time 50,000 Daltons or less and having the following composition: $A-O-(C_2H_4O)_e(C_3H_6O)_p-A'$ where subscripts e and p are the average number of $(C_2H_4O)$ and $(C_3H_6O)$ groups in the molecule respectively and the ratio e/p is greater than one and less than 9, A and A' are independently selected from a group consisting of hydrogen, alkyl, substituted alkyl, aryl, and substituted aryl groups provided that at least one of A and A' is H; (b) adding to the condensation product a non-aqueous fluid carrier that is miscible with the polyoxyalkylene polymer to form a mixture; (c) after step (a) and before step (d), removing any reaction solvent to a concentration of less than 2 weight-percent relative to condensation reaction product weight, including removing any aromatic solvent to a concentration of less than 5 weight-parts per million weight parts of condensation product; (d) dispersing into the mixture of step (c) a polyorganosiloxane comprising at least 90 mole-percent dimethyl D units and having a viscosity of 1,000,000 centipoise or more at 20 degrees Celsius under shear to produce a dispersion of polyorganosiloxane particles having an average size of 0.5 to 20 micrometers dispersed in the mixture of step (c) to form a composition; wherein: the weight-ratio of non-aqueous fluid carrier added in step (b) to condensation product prepared in step (a) is 0.5 or more and 10 or less; the weight-ratio of the combination of condensation product prepared in step (a) and non-aqueous fluid carrier added in step (b) to polyorganosiloxane dispersed in step (d) is 0.01 or more and 0.5 or less; and the composition contains less than one weight-part aromatic solvent per million weight parts composition.

The composition of present invention is useful for use as a slip additive in coating formulations. The process of the present invention is useful for preparing the composition of the present invention.

DETAILED DESCRIPTION OF THE INVENTION

Test methods refer to the most recent test method as of the priority date of this document when a date is not indicated with the test method number. References to test methods contain both a reference to the testing society and the test method number. The following test method abbreviations and identifiers apply herein: ASTM refers to ASTM International; EN refers to European Norm; DIN refers to Deutsches Institut für Normung; ISO refers to International Organization for Standards; and VDA refers to Verband der Automobilindustrie.

"Multiple" means two or more. "And/or" means "and, or as an alternative". All ranges include endpoints unless otherwise indicated. Products identified by their tradename refer to the compositions available from the suppliers under those tradenames at the priority date of this document unless otherwise stated herein.

"Alkyl" is a hydrocarbon radical derived from an alkane by removal of a hydrogen atom. "Substituted alkyl" is an alkyl that has an atom other than carbon and hydrogen in place of at least one carbon or hydrogen. Examples of substituted alkyls include alkyl amines and alkyl thiols.

"Aryl" is a radical derived from an aromatic hydrocarbon by removal of a hydrogen atom. "Substituted aryl" is an aryl that has an atom other than carbon and hydrogen in place of at least one carbon or hydrogen.

Designations of the type: "$C_{x-y}$" refer to having x or more and, at the same time, y or fewer carbon atoms.

"Miscible" components herein form a mixture that is transparent when viewed with the unaided eye.

Siloxane units are characterized by the designation M, D, T and Q. M refers to a siloxane unit having the formula "$(CH_3)_3SiO_{1/2}$", or "trimethyl M unit". D refers to a siloxane unit having the formula "$(CH_3)_2SiO_{2/2}$", or a "dimethyl D unit". T refers to a siloxane unit having the formula "$(CH_3)$ $SiO_{3/2}$". Q refers to a siloxane unit having the formula "$SiO_{4/2}$". Non-oxygen groups bound to the silicon atom in M, D and T units are methyl groups unless otherwise stated or indicated. Reference to a siloxane unit designation with the suffix "-type" refers to the siloxane unit where any one or more than one methyl group can actually be hydrogen or any carbon-bound substituent, including methyl. A "carbon-bound substituent" is a group that is bound to the silicon atom through a carbon atom. For instance, "D-type" siloxane units can have for example hydrogen, methyl, ethyl, propyl, butyl, phenyl, or any other carbon-bound substituent in any combination bound to the silicon atom at a non-oxygen location. Notably, an oxygen atom having a multiple of "½" subscript indicates that the oxygen bridges the specified atom to a second atom where the second atom is also specified with an oxygen having a multiple of "½" subscript. For example, "$(SiO_{4/2})(ZO_{1/2})$" refers to a Q-type group with a silicon atom bound through a single oxygen to a "Z" group.

"Aromatic solvent" refers to an aromatic material that is liquid at 23° C. at 101.325 kilopascals pressure, has a boiling temperature below 150° C. at 101.325 kilopascals pressure, and that is miscible with one or more than one component of the presently claimed composition. Examples of aromatic solvents include benzene, toluene, ethyl benzene, and the isomers of xylene.

The present invention includes a composition comprising a dispersion comprising a polyorganosiloxane, a condensation product of a polysiloxane resin and polyoxyalkylene polymer, and a non-aqueous fluid that is miscible with the polyoxyalkylene polymer. The dispersion comprises particles of the polyorganosiloxane polymer dispersed in a continuous phase that contains the condensation product and non-aqueous fluid carrier.

The composition contains less than one weight-part aromatic solvent per million weight parts composition. Determine the amount of aromatic solvent in a system such as the present composition by gas chromatography with flame ionization detection (GC-FID). Dilute analyte (for example, MQ resin) 1:10 (w/w) in n-heptane by shaking until dispersed along with octane as an internal standard. Analyze the solution using GC-FID under the following conditions: apply a one-microliter injection of analyte solution at the inlet, maintained at a temperature of 280 degrees Celsius (° C.) at a 50:1 split with a helium carrier gas flowing at 2.0 microliters per minute. Separation occurs in a DB-1 30 meter by 0.25 millimeter by 1.0 micrometer film column under a temperature gradient ranging from 30° C. to 300° C. at a rate of 15° C. per minute. Interpret data from the flame-ionization detector. Quantify aromatic content relative to the octane internal standard.

Polyorganosiloxane

The polyorganosiloxane of the present invention desirably has a viscosity of one kiloPascal*seconds (kPa*s) or more, 5 kPa*s or more, 10 kPa*s or more, 15 k Pa*s or more, 20 kPa*s or more, 25 kPa*s or more, 30 kPa*s or more, 40 kPa*s or more, 50 kPa*s or more, 75 kPa*s or more, and even 100 kPa*s. Determine viscosities herein at 25 degrees Celsius (° C.) in a shear rate range from 0.0001 to 0.01 $s^{-1}$ using either a TA Instruments Discovery Hybrid Rheometer (DHR) or an Anton Paar Modular compact Rheometer (MCR) equipped with a 25 millimeter diameter cone and plate geometry. Viscosity values are steady shear viscosities. Preferably, the polyorganosiloxane is a "gum", which means it has a William's plasticity number of 30 or higher, preferably 50 or higher, as determined by ASTM method 926. The polyorganosiloxane comprises at least 90 mole-percent D units.

Generally, the polyorganosiloxane of the present invention desirably has the following structure:

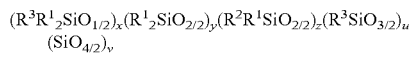
$(R^3R^1{}_2SiO_{1/2})_x(R^1{}_2SiO_{2/2})_y(R^2R^1SiO_{2/2})_z(R^3SiO_{3/2})_u$
$(SiO_{4/2})_v$ where:

$R^1$ is independently in each occurrence selected from a group of alkyl, aryl, substituted alkyl and substituted aryl groups; where $R^1$ has one carbon or more and at the same time 30 carbons or fewer, preferably six carbons or fewer. $R^1$ can be methyl in each occurrence.

$R_2$ is independently in each occurrence selected from a group consisting of hydrogen, hydroxyl, alkyl, aryl, substituted alkyl and substituted aryl groups; where $R^2$ has 30 carbons or fewer, preferably six carbons or fewer. Examples of suitable $R^2$ groups include $C_{2-30}$ alkyls (such as ethyl, propyl, n-butyl and t-butyl), fluorinated $C_{2-30}$ alkyls, cyclohexyl, $C_{2-4}$ alkyl thiols, $C_2$-4 primary alkyl amines, $—C_nH_{2n}NR'C_mH_{2m}NR'_2$ where R' is either H or $—C_mH_{2m}CH(OH)CH_2OH$ and m and n are independently selected from integers in a range of 2 to 4, $—C_nH_{2n}OCH_2CH(OH)CH_2N(CH_2CH(OH)CH_3)_2$ where n is an integer selected from a range of 2 to 4, $—C_nH_{2n}OCH_2CHOCH_2$ where n is an integer selected from a range of 2 to 4, $—C_nH_{2n}C(O)OH$ where n is an integer selected from a range of 2 to 4, and $—SCH_2C(O)OH$.

$R^3$ is independently in each occurrence selected from the options for $R^1$ and $R^2$.

Subscripts x, y, z, u and v indicate the average number of the specific molecular unit associated with the subscript in the molecule; x is an integer selected from a range of 2-50; y is an integer selected from a range of 1-10,000; z is an integer selected from a range of 0-200; u is an integer selected from a range of 1-50; and v is an integer selected from a range of 1-50 provided that (x+y+z+u+v) is 2,000 or higher; (u+v)/(x+y+z+u+v) is 0.4 or less; z/y is 0.05 or less and x/(x+y+z+u+v) is 0.6 or less; and provided the polyorganosiloxane has at least 90 mole-percent dimethyl D units.

The polyorganosiloxane can be linear or "substantially linear". Linear polyorganosiloxanes are characterized by the fact that the only siloxane units they contain are M-type and D-type siloxane units. "Substantially linear" polyorganosiloxanes are characterized by the fact that the only siloxane units they contain are M-type and D-type siloxane units and up to 5 moles of the sum of T-type and Q-type siloxane units per 100 moles of total siloxane units, and no two T or Q units are adjacent to one another in the molecule.

The polyorganosiloxane can advantageously have one or more than one terminal amine functionality. Terminal amine functionalities are desirable because they can react with other functionalities, such as acrylate and isocyanate functionalities, that are often present in binders. So, when compositions of the present invention comprise or are combined with acrylate functionalized binders in coating formulations, the terminal amines of the polyorganosiloxane can react and tie into the binder of the coating, which results in a coating with greater wear resistance and soil resistance.

Examples of suitable polyorganosiloxane include those in Table 1.

TABLE 1

| Component | Description |
|---|---|
| A1 | Hydroxyl terminated polydimethylsiloxane HO—(Si(CH$_3$)$_2$O)$_n$—Si—OH that has a number-averaged molecular weight of approximately 340,000 and a weight-averaged molecular weight of approximately 650,000 as measured by GPC, and a plasticity value within the limit 55-65 according to the method described above. (Commercially available from The Dow Chemical Company under the tradename Xiameter ™ RBG-0910 Gum.) |
| A2 | CH$_3$NHCH$_2$CH(CH$_3$)—CH$_2$—(Si(CH$_2$)$_2$O)$_n$—Si—CH$_2$CH(CH$_3$)CH$_2$NHCH$_3$. Prepare in the following manner: In a DAC 500 FVZ SpeedMixer ™ cup, 401.44 grams of A1 (Xiameter ™ 0910 Gum) and 0.48 grams of 1,2,2,4-tetramethyl-1-aza-2-silacyclopentane were added and mixed 5 times for 30 seconds each time at 2350 RPM. The content was let cool for 15 minutes between mixes. After the mixing, the content was placed in a 70° C. oven for 12 hours. A2 has a plasticity value similar to A1. |
| A3 | Vinyl terminated polydimethylsiloxane CH$_2$CH—(Si(CH$_3$)$_2$O)$_n$—Si—CHCH$_2$ having a number-averaged molecular weight of approximately 360,000 and a weight-average molecular weight of 660,000 as measured by GPC, and a plasticity value within the limit 55-65 according to the method described above.(commercially available from The Dow Chemical Company under the tradename Xiameter ™ RBG-0900 Gum |

In the method of the present invention the polyorganosiloxane is dispersed into the condensation product and non-aqueous carrier to form a dispersion of polyorganosiloxane particles. In the composition of the present invention, the polyorganosiloxane is present as dispersed particles having an average particle size of 0.5 micrometers (µm) or more and can be 1.0 µm or more, 2.0 µm or more, 3.0 µm or more, 4.0 µm or more, 5.0 µm or more and even 10 µm or more while at the same time is desirably 20 µm or less, preferably 15 µm or less, 12 µm or less, 10 m or less, 8 m or less, 6 m or less, even 5 m or less. Determine average particle size as the volume-weighted median value of particle diameter distribution (Dv50) of the polyorganosiloxane using a Mastersizer™ 3000 laser diffraction particle size analyzer from Malvern Instruments.

Condensation Product

The composition of the present invention comprises a condensation product of (i) a polysiloxane resin; and (ii) a polyoxyalkylene polymer. The condensation product of the polysiloxane resin and polyoxyalkylene polymer is a combination of multiple components that are produced by the condensation reaction. Isolating and identifying each component would be a difficult task. Moreover, removing any one of the reaction products may affect the function of the condensation product as a surfactant for stabilizing the polyorganosiloxane particles in the non-aqueous fluid. The products of the condensation reaction are used in the composition of the present reaction without isolating reaction products from one another. Therefore, this component is described as the "condensation product" of these the two reactants in order to make clear that multiple products resulting from the reaction are present.

The condensation reaction is run in a reaction solvent. Reaction solvent can be removed before or after combining the condensation reaction product with carrier fluid (described below). However, not all of the reaction solvent can be removed from the condensation reaction product and so some solvent is carried through into the composition of the present invention.

The condensation product, along with the carrier fluid described below, serves as a surfactant that enables dispersing and stabilizing the polyorganosiloxane into particles in the claimed particle size range.

Polysiloxane Resin.

The polysiloxane resin desirably has a weight-average molecular weight of 4,000 or more, 6,000 or more, 8,000 or more, 10,000 or more, 12,000 or more, 14,000 or more, 16,000 or more, 18,000 or more, 20,000 or more and at the same time desirably has a weight-average molecular weight of 50,000 or less, 48,000 or less, 46,000 or less, 44,000 or less, 42,000 or less, 40,000 or less, 38,000 or less, 36,000 or less, 34,000 or less, 32,000 or less 30,000 or less, 28,000 or less, 26,000 or less, 25,000 or less, or even 24,000 or less. Determine weight-average molecular weight in Daltons using triple-detector gel permeation chromatography (light-scattering, refractive index and viscosity detectors) and a single polystyrene standard.

The polysiloxane resin is an MQ resin having the following general composition:

$$(R_3SiO_{1/2})_a(SiO_{4/2})_b(ZO_{1/2})_c$$

where:

Subscripts a, b and c refer to the average molar ratio of the group associate with the subscript relative to total moles of silicon atoms in the molecule. Subscript a is a value in a range of 0.30-0.60, subscript b is a value selected from a range of 0.40-0.70, subscript c is a value selected from a range of 0.05-0.20. Necessarily, the sum of the values of subscripts a and b is one. For clarity, $ZO_{1/2}$ units are necessarily attached to Q units of the polysiloxane resin molecule. Desirably, the ratio of subscript a to subscript b is a value selected from a range of 0.4 to 1.5. Determine the values for subscripts a, b and c using $^{29}Si$, $^{13}C$ and $^1H$ nuclear magnetic resonance spectroscopy (see, e.g., *The Analytical Chemistry of Silicones*, Smith, A. Lee, ed., John Wiley & Sons: New York, 1991, p. 347ff.).

R is independently in each occurrence selected from a group consisting of hydrogen, alkyl, substituted alkyl, aryl and substituted aryl groups containing 1-30 carbon atoms. Typically, R is independently in each occurrence selected from a group consisting of alkyl and aryl groups containing from 1-30 carbon atoms, more typically 1-6 carbon atoms. Most typically, R is independently in each occurrence selected from methyl, ethyl, propyl and butyl groups.

Z is independently in each occurrence selected from a group consisting of H and C1-8 alkyls. Typically, Z is independently in each occurrence selected from a group consisting of H, methyl, ethyl, propyl and butyl. Preferably, Z is hydrogen.

Suitable polysiloxane resins are obtainable by synthetic methods taught in U.S. Pat. Nos. 2,676,182, 3,627,851, 3,772,247, 8,017,712 and 5,548,053. Suitable commercially available polysiloxane resins include those commercially available as DOWSIL™ MQ-1600 Resin (DOWSIL is a trademark of The Dow Chemical Company), SR-1000 MQ Resin (a=0.43, b=0.57, c=0.11, R=methyl; Z=3 H; from Momentive), and BELSIL™ TMS 803 (a=0.41, b=0.59, c=0.08, R=methyl; Z=3:5 molar ratio of H:ethyl; BELSIL is a trademark of Wacker Chemie AG).

Specific examples of suitable polysiloxane resin include those in Table 2. The structure of the polysiloxane resin is provided in terms of the following structure, as described above:

$$(R_3SiO_{1/2})_a(SiO_{4/2})_b(ZO_{1/2})_c$$

TABLE 2

| Component | Description |
| --- | --- |
| R1 | Trimethylsiloxysilicate resin having a weight-averaged molecular weight of approximately 27,500 as measured by GPC and where R is methyl, Z is a >90:10 mole ratio of hydrogen and isopropyl, a is approximately 0.43, b is approximately 0.57, c is approximately 0.13. (Commercially available from The Dow Chemical Company under the tradename DOWSIL ™ MW-1600 Solid Resin.) |
| R2 | Trimethylsiloxysilicate resin prepared by a silicate-based method of the type listed above having a weight-averaged molecular weight of approximately 8,700 as measured by GPC and where R is methyl, Z is a >90:10 mole ratio of hydrogen and isopropyl, a is approximately 0.48, b is approximately 0.56, c is approximately 0.15. |
| R3 | Trimethylsiloxysilicate resin prepared by a silicate-based method of the type listed above having a weight-averaged molecular weight of approximately 29,500 as measured by GPC and where R is methyl, Z is a >90:10 mole ratio of hydrogen and isopropyl, a is approximately 0.43, b is approximately 0.57, c is approximately 0.13. |
| R4 | Trimethylsiloxysilicate resin prepared by the method presented for R4 in the Examples section. R is methyl, Z is approximately 5:95 mole ratio of hydrogen and ethyl, a is approximately 0.41, b is approximately 0.59, c is approximately 0.17. Prepare R4 according to the method presented in the Examples section, below. Weight-average molecular weight is anticipated to be greater than 4000 Daltons based on the values of a, b and c and the inverse relationship observed between the mole ratio of structural terminal units to structural networking units (that is: (a + b)/c) and the weight-average molecular eight observed for R1-R3 polysiloxane resins. |

Polyoxyalkylene Polymer.

The polyoxyalkylene polymer has the following composition:

$$A-O(C_2H_4O)_e(C_3H_6O)_p-A'$$

where:

The subscripts e and p correspond the number of ethylene oxide and propylene oxide units in the molecule respectively. The ratio e/p is desirably one or more and can be 2 or more, 3 or more, 4 or more, 5 or more, 6 or more and at the same time is typically 9 or less, and can be 8 or less, 7 or less, 6 or less, even 5 or less. Desirably, the sum of e and p is 100 or higher, preferably 110 or higher, 120 or higher, 130 or higher, 140 or higher and at the same time is typically 1000 or lower, 750 or lower or even 500 or lower.

Determine the e/p mole ratio (X) from ratios of peak integrations in $^{13}C$- or $^1H$-nuclear magnetic resonance spectroscopy. Calculate a modified molecular weight value (Y) that excludes the weight of the polymer endgroups from the number average molecular weight value as $Mn-(M^A+M^{A'}+16.00)$, where Mn is the number average molecular weight, $M^A$ is the molar mass of the A end group, $M^{A'}$ is the molar mass of the A' end group. The value of "p" is $Y/(44.05*X+58.08)$. The value of "e" is the value of "p" multiplied by the e/p mole ratio (X). Determine $M^A$ and $M^{A'}$ by first identifying the composition of A and A' using 13C- or $^1H$-nuclear magnetic resonance spectroscopy. If the signal for A and A' is too low to determine structure by $^{13}C$- or $^1H$-nuclear magnetic resonance spectroscopy under conditions sufficient to determine the e/p ratio, then the molecular weight of A and A' can be considered negligible and use zero for the value of $M^A$ and $M^{A'}$ The propylene oxide component is valuable in the polyoxyalkylene polymer in order to increase flexibility of the resulting condensation product. The polyoxyalkylene polymer is linked to the polysiloxane resin molecules. The propylene oxide component is required to ensure fluidity in the polyoxyalkylene so the latter is a liquid for easy handing and mixing. The ethylene oxide and propylene oxide units can be in a block configuration, randomly distributed or partially in block configuration and partially random within the polyoxyalkylene polymer.

A and A' are independently in each occurrence selected from a group consisting of hydrogen, alkyl, substituted alkyl, aryl, and substituted aryl groups provided at least one of A and A' is hydrogen. Examples of suitable alkyl groups include methyl, ethyl, propyl, and butyl. Desirably, both A and A' are hydrogen.

The polyoxyalkylene polymer has a number-average molecular weight of 4,500 Daltons (Da) or more, typically 5,000 DA or more, preferably 10,000 Da or more, more preferably 12,500 Da or more while at the same time is typically 50,000 Da or less, preferably 30,000 Da or less, even more preferably 20,000 Da or less. Determine number-average molecular weight by gel permeation chromatography using 100 microliter injection of a 15 milligram per milliliter concentration of sample onto a Polymer Labs PLgel 5 micrometer guard column (50 millimeters by 7.5 millimeters) followed by two Polymer Labs PLgel 5 micrometer Mixed-C columns (300 millimeters by 7.5 millimeters) using tetrahydrofuran eluent at one milliliter per minute flow rate, a differential refractive index detector at 35° C. and 16 narrow polystyrene standards spanning a molecular weight range of 580 Da through 2,300 Da.

Specific examples of suitable polyoxyalkylene polymers include those in Table 3.

TABLE 3

| Component | Description |
|---|---|
| P1 | $HO(EO)_{310}(PO)_{63}OH$ having a number average molecular weight of approximately 17,000 Daltons commercially available from the Dow Chemical Company under the trade name UCON ™ Lubricant 75-H-90,000 |
| P2 | $Bu(EO)_{146}(PO)_{21}OH$ having a number average molecular weight of approximately 8,000 Daltons prepared as "P2" described in the Examples, below. |

Non-Aqueous Fluid Carrier (Carrier Fluid)

The composition of the present invention comprises a non-aqueous fluid that serves as a carrier fluid for the condensation product and serves as a continuous phase into which the polyorganosiloxane is dispersed. The non-aqueous fluid carrier is miscible with the polyoxyalkylene polymer.

The weight ratio of the non-aqueous fluid carrier to condensation product is 0.5 or more, and can be one or more, 2 or more, 3 or more, 4 or more, 5 or more, 6 or more, 7 or more, even 8 or more while at the same time is generally 10 or less and can be 9 or less, 8 or less, 7 or less, 6 or less, even 5 or less.

The ratio of the combined weight of the condensation product and the non-aqueous fluid carrier to the weight of polyorganosiloxane is typically 0.01 or more, 0.05 or more, 0.15 or more, 0.20 or more, 0.25 or more, 0.30 or more, 0.35 or more, 0.40 or more, even 0.45 or more, while at the same time is generally 0.50 or less and can be 0.45 or less, 0.40 or less, 0.35 or less, 0.30 or less, 0.25 or less, 0.20 or less, 0.15 or less, 0.10 or less, and even 0.05 or less.

Specific examples of suitable non-aqueous carrier fluids include those in Table 4.

TABLE 4

| Component | Description |
|---|---|
| C1 | A secondary alcohol ethoxylate of the formula $C_nH_{2n+1}(OCH_2CH_2)_mOH$ with n = 11-15 and m = 9 (for example, "TERGITOL ™ 15-S-9 Surfactant available from The Dow Chemical Company) |
| C2 | $CH_2CH(OH)CH_2OCH_2CH(OH)CH_3$. (for example, Dow Dipropylene Glycol LO+, available from The Dow Chemical Company). |

Aqueous Liquid

The composition of the present invention can further include an aqueous liquid mixed with the other components. Aqueous liquid, preferably water, is optionally included primarily as a dilution liquid and is desirable when the composition is part of a water-based coating formulation. The concentration of aqueous liquid can be up to 500 weight-parts per 100 weight-parts of the polyorganosiloxane.

Binders

The composition of the present invention can further comprise one or more than one binder. The dispersion of the composition of the present invention is useful as a slip aid in compositions such as coating compositions. Slip aids serve to reduce friction on the surface of a coating. Coatings contain binders that form a film over a substrate. Examples of binders that can be present in the composition of the present invention include acrylic and/or polyurethanes binders. Acrylic binders include solvent based acrylic, acrylic emulsions, water-based anionic emulsions of pure acrylic copolymer, water-based anionic self-crosslinking styrene-acrylic copolymer emulsions, water-based anionic, styrene-acrylic emulsion containing free hydroxyl groups and water-based anionic self-crosslinking copolymer emulsions. Polyurethane binders include water-based anionic dispersions of aliphatic polycarbonate urethane, water-based solvent free anionic dispersions of aliphatic polyether urethane, aqueous non-ionic dispersions of aliphatic polyester urethane and aqueous solvent-free anionic dispersions of an aliphatic polycarbonate-polyether urethane.

Low Levels of Aromatic Solvent

An exceptionally low concentration of aromatic solvent is a characteristic feature of the composition of the present invention. The concentration of aromatic solvent is one weight-percent (wt %) or less, preferably 0.75 wt % or less, more preferably 0.50 wt % or less, even more preferably 0.25 wt % or less, 0.10 wt % or less, 0.05 wt % or less or even 0.00 wt % relative to the weight of the composition. Determine wt % aromatic solvent in the composition by the GC-FID method as described previously above for determining concentration of aromatic solvent.

Aromatic solvents are commonly used in condensation reactions, such as those used to prepare the condensation product of the present invention, because they efficiently solubilize the reactants. However, if aromatic solvents are used in the condensation reaction, they need to be removed prior to dispersing polyorganosiloxane because it is nearly impossible to remove aromatic solvent after dispersing polyorganosiloxane. Methods for removing/reducing aromatic solvents are described under the Methods section, below, as "Option 1".

One particularly desirable solution discovered as part of the present invention was to identify a suitable non-aromatic solvent for use as the reaction solvent for the condensation reaction, thereby eliminating the need for an aromatic reaction solvent that needs to be removed to achieve the composition of the present invention. This method is described in the Methods section, below, as "Option 2". It is not easy to identify a suitable non-aromatic solvent that is suitable as the reaction solvent for the condensation reaction between the polysiloxane resin and polyoxyalkylene polymer. Aromatic solvents are rather unique as reaction solvents by being miscible with both the polysiloxane resin and polyoxyalkylene polymer to facilitate the condensation reaction, while further being suitable for azeotropic removal of water by-products to low levels to further facilitate driving the condensation reaction. Identifying non-aromatic reaction solvents that serve both of these purposes well is challenging.

As described in more detail below, it was discovered as part of the present invention that the condensation reaction could be run in a first non-aromatic solvent that has a boiling point in a range of 50-200° C. at 101.325 kilopascals pressure provided the non-aromatic solvent has Hansen solubility parameter values of 15.0-22.6 $(MPa)^{1/2}$ for $\delta_d$, 2.8-7.0 $(MPa)^{1/2}$ for $\delta_p$ and 4.0-7.5 $(MPa)^{1/2}$ for $\delta_h$. It was found to be even more desirable to run the condensation reaction in a non-aromatic solvent that is a combination of the first non-aromatic solvent and a second non-aromatic solvent having a a boiling point in a range of 50-200 degrees Celsius at 101.325 kilopascals pressure and Hansen solubility parameter values of 12.5-18.7 $(MPa)^{1/2}$ for $\delta_d$, 0.0-1.5 $(MPa)^{1/2}$ for $\delta_p$ and 0.0-3.4 $(MPa)^{1/2}$ for $\delta_h$, and a solubility of water that is less than 0.075 weight-percent based on weight of the second non-aromatic solvent. Even more desirable was to run the condensation reaction in a non-aromatic solvent in a combination of the first and second non-aromatic solvents where the combination has combined Hansen solubility parameter values of 15.0-16.4 $(MPa)^{1/2}$ for $\delta_d$, 2.0-5.0 $(MPa)^{1/2}$ for $\delta_p$ and 3.3-6.3 $(MPa)^{1/2}$ for $\delta_h$. When the condensation reaction is run in any of these non-aromatic solvent options, at least a portion of the non-aromatic solvent remains with the condensation product and is carried into the composition of the present invention as a "finger print" that the condensation product was made using that solvent because not all of the solvent can be removed. Hence, the condensation product (and the composition itself) can contain a first non-aromatic solvent that has a boiling point in a range of 50-200° C. at 101.325 kilopascals pressure provided the non-aromatic solvent has Hansen solubility parameter values of 15.0-22.6 $(MPa)^{1/2}$ for $\delta_d$, 2.8-7.0 $(MPa)^{1/2}$ for $\delta_p$ and 4.0-7.5 $(MPa)^{1/2}$ for $\delta_h$; can contain the first non-aromatic solvent and a second non-aromatic solvent having a a boiling point in a range of 50-200 degrees Celsius at 101.325 kilopascals pressure and Hansen solubility parameter values of 12.2-18.7 $(MPa)^{1/2}$ for $\delta_d$, 0.0-1.7 $(MPa)^{1/2}$ for $\delta_p$ and 0.0-3.4 $(MPa)^{1/2}$ for $\delta_h$; and even can contain a combination first and second aromatic solvent that have combined Hansen solubility parameter values of 15.0-16.4 $(MPa)^{1/2}$ for $\delta_d$, 2.0-6.0 $(MPa)^{1/2}$ for $\delta_p$ and 3.3-6.3 $(MPa)^{1/2}$ for $\delta_h$. Compositions that have any of these three "fingerprints" are particularly desirable because they indicate compositions that could have been made in an absence of added aromatic solvents and, as a result, the condensation product could have a concentration of aromatic solvent that is less than five weight parts per million weight parts condensation product and the final composition of the invention would have a concentration of aromatic solvent that is less than one weight part per million weight parts composition.

Examples of suitable first non-aromatic solvents include: 2-heptanone, n-butyl acetate, diethylcarbonate, isobutyl isobutyrate, propyl propionate, and methyl isobutyl ketone.

Examples of suitable second non-aromatic solvents include: pentane, hexane, heptane, octane, nonane, and decane.

Examples of blend of first and second non-aromatic solvents that have combined Hansen solubility parameter values of 15.0-16.4 $(MPa)^{1/2}$ for $\delta_d$, 2.0-6.0 $(MPa)^{1/2}$ for $\delta_p$ and 3.3-6.3 $(MPa)^{1/2}$ for $\delta_h$ include: 83:17 (w/w) blend of 2-heptanone and heptane, and 75:25 (w/w) blend of n-butyl acetate and heptane.

Typically, the first non-aromatic solvent is present in the composition at a concentration of 20,000 weight-parts or less, preferably 10,000 weight-parts or less, and can be 5,000 weight-parts or less, 3,000 weight-parts or less, 1,000 weight-parts or less, 900 weight-parts or less, 700 weight-parts or less, even 500 weight-parts or less while at the same time, if present, is typically present at a concentration of one weight-part or more, 5 weight-parts or more, 10 weight-parts or more, 25 weight-parts or more, 50 weight-parts or more and can be 100 weight-parts or more with weight-parts relative to one million weight-parts of the composition.

Typically the second non-aromatic solvent is present in the composition at a concentration of 20,000 weight-parts or less, preferably 10,000 weight-parts or less, and can be 5,000 weight-parts or less, 3,000 weight-parts or less, 1,000 weight-parts or less, 900 weight-parts or less, 700 weight-parts or less, even 500 weight-parts or less while at the same time, if present, is typically present at a concentration of one weight-part or more, 5 weight-parts or more, 10 weight-parts or more, 25 weight-parts or more, 50 weight-parts or more and can be 100 weight-parts or more with weight-parts relative to one million weight-parts of the composition.

Catalyst

Another advantage of the present invention is that it can be free of tin catalysts. Some condensation reactions require the use of tin catalysts, which, if used in preparing dispersions of polyorganosiloxanes, are carried through to the final composition. Tin catalysts are undesirable in some applications. The condensation reaction used to prepare the condensation product of the present invention can be run without tin catalyst thereby avoiding introduction of tin catalyst. As such, the condensation reaction product and final composition can be free of tin catalyst.

Method

The present invention includes a method for preparing the composition of the present invention. The method comprises:

(a) preparing a condensation product by conducting a condensation reaction in a reaction solvent between:
(i) a polysiloxane resin having a weight-average molecular weight of 4,000-50,000 and having the following composition:

where subscripts a, b and c refer to the average molar ratio of the group associated with the subscript relative to total moles of silicon atoms in the molecule, subscript a is 0.30-0.60, subscript b is 0.40-0.70, subscript c is 0.05-0.20, the sum of subscripts a and b is one, R in each occurrence is selected from a group consisting of hydrogen, alkyl and aryl groups containing 1-30 carbon atoms, and Z is in each occurrence selected from a group consisting of H, and $C_1$-$C_8$ alkyls; and (ii) a polyoxyalkylene polymer having the following composition:

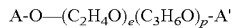

where the value of e/p is greater than one and less than 9, A and A' are independently selected from a group consisting of hydrogen, alkyl, substituted alkyl, aryl, and substituted aryl groups provided that at least one of A and A' is H;

(b) adding to the condensation product a non-aqueous fluid carrier that is miscible with the polyoxyalkylene polymer to form a mixture;

(c) after step (a) and before step (d), removing reaction solvent to a concentration of less than 2 weight-percent relative to condensation reaction product weight, including removing any aromatic solvent to a concentration of less than 5 weight-parts per million weight parts of condensation product;

(d) dispersing into the mixture of step (c) a polyorganosiloxane comprising at least 90 mole-percent dimethyl D units and having a viscosity of 1,000,000 centipoise or more at 20 degrees Celsius under shear to produce a dispersion of polyorganosiloxane particles having an average size of 0.5 to 20 micrometers dispersed in the mixture of step (c) to form a composition;

wherein: the weight-ratio of non-aqueous fluid carrier added in step (b) to condensation product prepared in step (a) is 0.5 or more and 10 or less; the weight-ratio of the combination of condensation product prepared in step (a) and non-aqueous fluid carrier added in step (b) to polyorganosiloxane dispersed in step (d) is 0.01 or more and 0.5 or less; and the composition contains less than one weight-part aromatic solvent per million weight parts composition.

The polyorganosiloxane (a), polysiloxane resin (b)(i), polyoxyalkylene polymer (b)(ii) and non-aqueous fluid carrier are as described above for the composition.

Desirably, the weight-ratio of polyoxyalkylene polymer (b)(ii) to polysiloxane resin (b)(i) is 0.5 or more, preferably one or more, 2 or more, 3 or more, 4 or more, 5 or more, even 6 or more while at the same time is typically 7 or less, and can be 6 or less, 5 or less, 4 or less, 2 or less, and even one or less.

Removing reaction solvent in step (c) can occur after step (a) and before step (b) or after both steps (a) and (b) and prior to step (d). Desirably, removal of any aromatic reaction solvent occurs prior to addition of carrier fluid in step (b).

The method of the present invention is advantageous over other methods because it allows for direct emulsification of the polyorganosiloxane in contrast to emulsion polymerization methods for polymerizing the polyorganosiloxane from emulsified reactants. Emulsion polymerization is used when the surfactant system is insufficient to directly emulsify the polyorganosiloxane. Unfortunately, surfactants used to emulsify the reactants when for forming the polyorganosiloxane by emulsion polymerization tend to be insufficient to stabilize the polyorganosiloxane in coating formulation containing organic solvent such as coalescing agents. The method of the present invention avoids the need of a cumbersome emulsion polymerization process and provides a surfactant (the condensation product) that is able to directly form a stable emulsion of the polyorganosiloxane.

A particular challenge with the method is to prepare the composition so that it contains less than one weight part aromatic solvent per million weight parts composition. It is very difficult, if at all possible, to remove aromatic solvent present in the composition containing the polyorganosiloxane dispersed in the condensation product and the non-aqueous fluid carrier. Aromatic solvents tend to be miscible with the polyorganosiloxane and would solubilize into the dispersed polyorganosiloxane particles, rendering it difficult to remove. Additionally, heating to remove the aromatic solvent can destabilize the surfactants stabilizing the dispersion of polyorganosiloxane. Hence, in order to obtain the composition of the present invention it was important to discover how to either remove or avoid including aromatic solvent in the condensation product prior to dispersing the polyorganosiloxane into it.

The method of the present invention requires preparing a condensation reaction product, reducing the amount of aromatic solvent if present to a level of less than five weight-part per million weight parts condensation product, adding to the condensation product a non-aqueous fluid carrier that is miscible with the polyoxyalkylene polymer used to make the condensation product to make a mixture and then dispersing into the mixture a polyorganosiloxane to provide the composition of the present invention. In this manner, the concentration of aromatic solvent is low enough prior to dispersing the polyorganosiloxane so as to achieve the desired target of less than one weight part aromatic solvent per million weight parts of the final composition.

There are two primary ways to accomplish the method of the present invention: (1) preparing the condensation product in the presence of an aromatic solvent and then removing the aromatic solvent prior to dispersing the polyorganosiloxane component; or, preferably, (2) preparing the condensation product in a non-aromatic solvent so the concentration of aromatic solvent is inherently less than five weight-part per million weigh parts condensation product without having to remove aromatic solvent.

Option 1—Preparing Condensation with Aromatic Solvent.

It is common to carry out condensation reactions in aromatic solvent. However, an objective of the present invention is to prepare a dispersion of polyorganosiloxane in the condensation product while achieving a concentration of aromatic solvent that is less than one weight-part per one million weight-parts dispersion composition. Removing aromatic solvent to such a low concentration after preparing the dispersion is difficult if possible. Hence, if the condensation reaction mixture includes an aromatic solvent it is necessary to remove the aromatic solvent prior to dispersing the polyorganosiloxane, preferably to a concentration of five weight-part or less per million weight-parts of condensation reaction product.

One method for removing aromatic solvent is by heating the condensation reaction mixture in a batch vessel to distill out volatile solvent, optional under vacuum. Alternatively, the condensation reaction mixture can pass through a wiped-film evaporation apparatus at an elevated temperature and/or run under reduced pressure to remove volatile aromatic solvent.

One desirable method for removing aromatic solvent is by twin screw extrusion, where after preparing condensation product in the presence of aromatic solvent, run the resulting condensation product through a twin screw extruder at elevated temperature and/or reduced pressure while removing volatile aromatic solvent.

Upon removal of aromatic solvent, polyorganosiloxane is dispersed into a combination of the non-aqueous fluid carrier and the remaining condensation reaction product.

Option 2—Preparing Condensation without Aromatic Solvent.

A surprising outcome of the present invention is discovering a suitable solvent that is useful for conducting the condensation reaction that does not require aromatic solvent. Aromatic solvents have particularly desirably characteristics that make identifying a substitute solvent challenging. For example, a desirable solvent for the condensation reaction should concomitantly be non-aromatic and have one, preferably two, more preferably three and most preferably all four of the following: (a) miscibility with the polysiloxane resin used in the condensation reaction; (b) miscibility with the polyoxyalkylene polymer used in the condensation reaction; (c) sufficient volatility (that is, having a boiling point of 200° C. or less at 101.325 kPa pressure) so as to be removable from the condensation reaction product if desired; and (d) desirably capable of forming an azeotrope with water to facilitate removal of water with the solvent.

The inventors have discovered that the condensation reaction of the present invention can be run in a non-aromatic solvent that contains less than one weight-part aromatic solvent (preferably that is free of aromatic solvent) based on one million weight parts combined weight of polysiloxane resin, polyoxyalkylene polymer, and non-aromatic solvent provided the solvent comprises, or consists of a first non-aromatic solvent (as described above) having a boiling point in a range of 50-200 degrees Celsius at 101.325 kilopascals pressure and Hansen solubility parameter values of 15.0-22.6 $(MPa)^{1/2}$ or $\delta_d$, 2.8-7.0 $(MPa)^{1/2}$ for $\delta_p$ and 4.0-7.5 $(MPa)^{1/2}$ for $\delta_h$. Preferably, the non-aromatic solvent that comprises or consists of a blend of the first non-aromatic solvent and a second non-aromatic solvent (as described above) having a boiling point in a range of 50-200 degrees Celsius at 101.325 kilopascals pressure and Hansen solubility parameter values of 12.2-18.7 $(MPa)^{1/2}$ for $\delta_d$, 0.0-1.7 $(MPa)^{1/2}$ for $\delta_p$ and 0.0-3.4 $(MPa)^{1/2}$ for $\delta_h$ and having a solubility of water that is less than 0.075 weight-percent based on weight of the second non-aromatic solvent. Desirably, the blend of first and second non-aromatic solvents (as described above) has Hansen solubility parameter values of 15.0-16.4 $(MPa)^{1/2}$ for $\delta_d$, 2.0-6.0 $(MPa)^{1/2}$ for $\delta_p$ and 3.3-6.3 $(MPa)^{1/2}$ for $\delta_h$. Desirably, the blend of first non-aromatic solvent and second non-aromatic solvent contains a weight ratio of second non-aromatic solvent to first non-aromatic solvent that is 0.05 or greater, preferably 0.07 or greater and can be 0.09 or greater 0.10 or greater, 0.12 or greater, 0.14 or greater, 0.16 or greater, 0.18 or greater, 0.18 or greater, 0.20 or greater, 0.22 or greater even 0.24 or greater while at the same time is typically 0.5 or less, 0.48 or less, 0.46 or less, 0.44 or less, 0.42 or less, 0.40 or less, 0.38 or less, 0.36 or less, 0.34 or less, 0.32 or less, 0.30 or less, 0.28 or less, 0.26 or less, and even can be 0.24 or less.

Desirably, the condensation reaction is run in a solvent that consists of the first non-aromatic solvent or a combination of the first non-aromatic solvent and second non-aromatic solvent as described above.

EXAMPLES

Synthesis of Polysiloxane Resins "R4"

Add to a 3-necked round-bottom flask 210.09 g tetraethoxysilane (available from The Dow Chemical Company as DOWSIL™ Z-6697 Silane) and 89.99 g of trimethylethoxy silane (commercially available from Gelest, Inc.). Continuously stir the mixture at 300 revolutions per minute throughout the course of the reaction under an inert atmosphere. Add 681 microliters of 37 wt % aqueous hydrochloric acid (available from Fisher Scientific) and heat to 50° C. Add 44.84 g deionized water dropwise and the hold the mixture at reflux (77.6° C.) for two hours. Cool the mixture and add 110.18 g of 2-heptanone (from Sigma Aldrich) and attach a Dean-Stark trap to the set up to collect byproduct ethanol. Heat the mixture to 100° C. while removing ethanol. Once at 100° C., cool the reaction and add 911 microliters of 45 wt % aqueous potassium hydroxide (available from Fisher Scientific) and an additional 11.65 g of deionized water. Heat to reflux (151.8° C.) and hold for one hour as water is collected in the Dean-Stark trap. Cool the mixture and add 760 microliters of 37 wt % aqueous hydrochloric acid. Heat the mixture again to reflux for one hour and collect distilled water in the Dean Stark trap. Cool and add 5.21 g of magnesium oxide. Mix for 30 minutes. Filter the resulting product ("R4") through a filter medium with a nominal pore size of 0.45 micrometers.

Synthesis of Polyoxyalkylene "P2"

Charge a 500 milliliter (mL) round bottom flask with 233.58 grams (g) diglyme (diethylene glycol dimethyl ether, Aldrich, anhydrous 99.5%), 18.04 g of triethylene glycol butyl ether, and 1.96 g of 50% aqueous potassium hydroxide. Fit the flask with a temperature controlled heating mantle, six plate vacuum jacketed and silvered Oldershaw column, and water cooled reflux/distillation head. Apply vacuum using a dry ice protected Edwards vacuum pump. Heat the light yellow solution under vacuum of 7 torr to a pot temperature of 60 to 65° C. to collect 25.34 g of distillate at a head temperature of 30 to 52° C. Cool the solution under vacuum and then release the vacuum with nitrogen to achieve a light yellow solution.

Charge a conical bottom 2-liter (L) Parr reactor with the light yellow solution. Seal the reactor, pressure check it, purge with nitrogen and then heat to 120° C. Add 618.6 g of ethylene oxide mixed with 2.04 g of propylene oxide at an addition rate of 2 grams per minute for 220 minutes, then one gram per minute for 370 minutes. Hold the mixture overnight at 120° C., then cool to 60° C. Purge the headspace for 15 minutes and then unload 1013.53 g of reaction product. Mix the reaction product with 1.05 g of acetic acid. Filter the product to a nominal particle size of 0.45 micrometers and isolate from diglyme by rotary evaporation at 120° C. under reduced pressure of 5 millimeters mercury to achieve polyoxyalkylene "P2".

Preparation of Condensation Products B1-B15

Prepare a reactor consisting of a three-necked round bottom flask equipped with a glass stir paddle and stir shaft, thermocouple, and a Dean Stark trap pre-filled with solvent connected to a water cooled condenser and a nitrogen purge. Dissolve polysiloxane resin component (R) into the reaction solvent (S) in the reactor and then add polyoxyalkylene (P) while mixing. After 10 minutes add reaction catalyst (C). Heat to achieve a vigorous reflux and collect water in the Dean Stark trap. After 7 hours cool the mixture, deactivate the catalyst by chemical neutralization, filter and cool to 25° C. Table 5 identifies the components for B1-B16.

Solvent can be stripped from the filtrate to directly obtain condensation product using, for example, a twin screw extruder. However, in these examples, non-aqueous fluid carrier (carrier fluid) was added to the filtrate prior to removing solvent. Add carrier fluid identified in Table 6, below, at a concentration sufficient to achieve the mass ratio of carrier fluid to condensation product evident in Table 6. Remove reaction solvent (S) to a concentration of less than 2 weight-percent based on weight of condensation product by rotary evaporation at 10 millimeters mercury at 105° C. to achieve the "condensation product".

TABLE 5

| Condensation Product | R (g) | Solvent (g) | Catalyst (g) | P (g) |
|---|---|---|---|---|
| B1 | R1 (66.09) | 2-heptanone/heptanes (335.01/67.02) | Potassium Hydroxide (0.44) | P1 (131.99) |
| B2 | R1 (66.01) | Heptanes/n-butyl acetate (66.99/335.07) | Sodium acetate (0.29) | P1 (133.07) |
| B3 | R1 (66.01) | Heptanes/methyl isobutyl ketone (67.53/335.86) | Potassium Hydroxide (0.44) | P1 (132.56) |
| B4 | R1 (33.94) | 2-heptanone (198.35) | Sodium acetate (0.30) | P1 (67.50) |
| B5 | R1 (67.88) | 2-heptanone/heptanes (330.61/66.18) | Potassium Hydroxide (0.40) | P1 (135.01) |
| B6 | R1 (99.99) | 2-heptanone/heptanes (338.40/67.74) | Potassium Hydroxide (0.40) | P1 (100.15) |
| B7 | R1 (158.49) | 2-heptanone/heptanes (670.04/134.05) | Sodium acetate (0.58) | P1 (237.86) |
| B8 | R1 (67.64) | 2-heptanone/heptanes (342.62/68.52) | Potassium Hydroxide (0.20) | P1 (135.00) |
| B9 | R1 (10.00) | Diethyl carbonate (60.00) | Tin(II)ethylhexanoate (0.14) | P1 (20.00) |
| B10 | R1 (10.00) | Diethyl carbonate (60.00) | Aluminum(II) acetylacetonate (0.11) | P1 (20.00) |
| B11 | R2 (25.0) | Heptanes/methylisobutyl ketone (25.38/126.89) | Potassium Hydroxide (0.11) | P1 (50.0) |
| B12 | R2 (25.0) | Heptanes/methylisobutyl ketone (25.38/126.89) | Potassium Hydroxide (0.11) | P2 (50.0) |
| B13 | R3 (24.98) | Heptanes/n-butyl acetate (24.97/124.88) | Sodium acetate (0.11) | P1 (50.01) |
| B14 | R3 (25.0) | Heptanes/n-butyl acetate (24.97/124.88) | Sodium acetate (0.11) | P2 (49.99) |
| B15 | R4 (57.04) | 2-heptanone (175.3) | Sodium acetate (0.30) | P1 (67.50) |

Preparation of Slip Aid Compositions (Exs 1-15)

Prepare slip aid compositions of the present invention (Exs 1-15) according to one of two methods with the compositions as set forth in Table 6 and then characterize the particle size of polyorganosiloxane in the composition. Examples (Exs) 1 and 2 are made with Method 2. Exs 3-15 are made using Method 1:

Method 1:

Prepare the composition using a SpeedMixer™ DAC 150 FVC from FlackTek Inc. Add to a Max-60 cup fit for use with a DAC 150 FVZ mixer 17.5 g of polyorganosiloxane (component A), 8 g of glass beads from Fisher Scientific (11-312A), and 6.25 g of a mixture of a condensation product (B) and a non-aqueous fluid carrier (C). Cap the cup and spin the sample in the mixer at 3500 revolutions per minute for 2 minutes. Cool the sample to room temperature before spinning again at 3500 revolutions per minute for one minute. Add 11.5 g of water (alternatively, dipropylene glycol LO+ from The Dow Chemical Company for Ex 3) to the sample in three incremental steps, each followed by spinning the sample in the mixer for 30 seconds.

Method 2:

Prepare compositions using a Ross VMC-1 mixer from Charles Ross & Son Company in the following manner. Load into a stainless steel vessel 364 g of a mixture of condensation product (B) and non-aqueous fluid carrier (C) and 565 g of polyorganosiloxane (component A). Mix the contents for 20 minutes at 1020 revolutions per minute for the dual dispersers and 35 revolutions per minute for the scraper. Add another 452 g of the same component A, followed by mixing under the same conditions for 50 minutes. Add 619 g of water in three incremental steps, each followed by mixing until a homogeneous dispersion is achieved.

Determine the average particle size of the polyorganosiloxane (component A) in each sample as Dv50 using a Mastersizer™ 3000 laser diffraction particle size analyzer from Malvern Instruments. Particle size is in micrometers (m). Exs 1-6 and 8-15 are free of tin catalysts.

TABLE 6

| Sample | Polyorganosiloxane (g) | Condensation Product (g) | Non-Aqueous Fluid Carrier (g) | Polyorganosiloxane Particle Size (μm) |
|---|---|---|---|---|
| Ex 1 | A1 (1017) | B1 (121) | C1 (243) | 4.50 |
| Ex 2 | A1 (1017) | B2 (121) | C1 (243) | 3.59 |
| Ex 3 | A1 (17.5) | B3 (2.08) | C2 (4.17) | 2.75 |
| Ex 4 | A1 (17.5) | B6 (2.08) | C1 (4.17) | 2.91 |
| Ex 5 | A1 (17.5) | B7 (2.08) | C1 (4.17) | 3.65 |
| Ex 6 | A1 (17.5) | B8 (2.08) | C1 (4.17) | 3.85 |
| Ex 7 | A1 (17.5) | B9 (2.08) | C1 (4.17) | 5.30 |
| Ex 8 | A1 (17.5) | B10 (2.08) | C1 (4.17) | 3.14 |
| Ex 9 | A1 (17.5) | B11 (2.08) | C1 (4.17) | 6.90 |
| Ex 10 | A1 (17.5) | B12 (2.08) | C1 (4.17) | 6.80 |
| Ex 11 | A1 (17.5) | B13 (2.08) | C1 (4.17) | 4.89 |
| Ex 12 | A1 (17.5) | B14 (2.08) | C1 (4.17) | 6.91 |
| Ex 13 | A1 (17.5) | B15 (2.08) | C1 (4.17) | 13.0 |
| Ex 14 | A2 (17.5) | B6 (2.08) | C1 (4.17) | 6.72 |
| Ex 15 | A3 (17.5) | B8 (2.08) | C1 (4.17) | 9.21 |

The data in Table 6 reveals that the condensation products of the present invention suitably disperse the polyorganosiloxane to desirable particle sizes. Each of these dispersions are aqueous continuous and are stable, thereby demonstrating stability in aqueous environment.

Comparative Examples (Comp Exs) A and B

Comp Exs A and B illustrate results for similar dispersions in prior art references. Comp Ex A corresponds to example 2 of U.S. Pat. No. 8,877,293 and Comp Ex B corresponds to example 1 of WO2016014609.

Comp Ex A. To a Max-100 cup (150 mL polypropylene cup) fit for use with the DAC 150 FVZ SpeedMixer™ add 35 g of polyorganosiloxane A1, 16 g of 3 mm diameter spherical glass beads (Fisher), and 7 g of surfactant (poly (ethylene glycol)-block-poly(propylene glycol)-block-poly (ethylene glycol) having a number average molecular weight of approximately 14,600; commercially available as Pluronic™ F-108; Pluronic is a trademark of BASF Corporation). Close the cup and place into the mixer and spin at 3450 revolutions per minute for three minutes. Open the cup and stir the contents with a spatula. Close the cup and spin on the mixer for an addition one minute at 3450 revolutions per minute. Dilute the resulting mixture with 28 g of deionized water in four increments (3 g, 5 g, 8 g and 12 g), each addition followed by spinning the cup for 30 seconds at 3450 revolutions per minute. The resulting mixture consists of a stable oil-in water emulsion of the polyorganosiloxane in water and having a silicone content of 50 percent by weight of the emulsion. The polyorganosiloxane has an average particle size of 3.05 micrometers (Dv50).

Comp Ex B. To a Max-100 cup (150 mL polypropylene cup) fit for use with the DAC 150 FVZ SpeedMixer™ add 50 g of polyorganosiloxane A1, 10 g of a water-soluble branched silicone polyether having a nominal formula weight of 28,000 g/mol (available as DOWSIL™ OFX-5247 Fluid from The Dow Chemical Company). Mix the contents of the cup in the mixer for 60 seconds at 2500 revolutions per minute. Repeat the mixing two more times at 3000 revolutions per minute. Add 40 g of water in three increments, each addition followed by mixing for 60 seconds at 3000 revolutions per minute in the same mixer. The resulting mixture is a homogeneous stable white oil-in-water emulsion having an average polyorganosiloxane particle size of 6.88 micrometers (Dv50).

Solvent Stability Characterization

Table 7 contains the solvent stability characterization results for the Exs and Comp Exs. Determine the stability in six different solvents: propylene glycol, dipropylene glycol methyl ether (DOWANOL™ DPM glycol ether; DOWANOL is a trademark of The Dow Chemical Company), butyl glycol, propylene glycol n-butyl ether (DOWANOL™ PnB glycol ether), dipropylene glycol n-butyl ether (DOWANOL™ DPnB glycol ether), ester alcohol (TEXANOL™ ester alcohol; TEXANOL is a trademark of Eastman Chemical Company).

For each solvent, dilute a sample of the dispersion by adding into a glass vial 5 weight parts deionized water and one weight-part solvent. Shake the vial to mix the contents. Add one weight-part of dispersion and shake to mix. Allow the vial to set for 24 hours and then visually observe the vial contents and characterize the status of the dispersion according to the following categories: STABLE: no visible phase separation observed; PHASE SEPARATED: visible polyorganosiloxane chunks phase separated out of the emulsion; and CREAMING: emulsion droplets diffuse to the top, but no visible polyorganosiloxane chunks are visible.

The data in Table 7 reveals that the dispersion compositions of the present invention are stable to solvents while the two comparative examples are not.

TABLE 7

| Dispersion | Propylene glycol | DOWANOL DPM | Butyl glycol | DOWANOL PnB | DOWANOL DPnB | TEXANOL |
|---|---|---|---|---|---|---|
| Ex 1 | STABLE | STABLE | STABLE | STABLE | STABLE | STABLE |
| Ex 2 | STABLE | STABLE | STABLE | STABLE | STABLE | STABLE |
| Ex 3 | STABLE | STABLE | STABLE | STABLE | STABLE | STABLE |
| Ex 4 | STABLE | STABLE | STABLE | STABLE | STABLE | STABLE |
| Ex 5 | STABLE | STABLE | STABLE | STABLE | STABLE | STABLE |
| Ex 6 | STABLE | STABLE | STABLE | STABLE | STABLE | STABLE |
| Ex 7 | STABLE | STABLE | STABLE | STABLE | STABLE | STABLE |
| Ex 8 | STABLE | STABLE | STABLE | STABLE | STABLE | STABLE |
| Ex 9 | STABLE | STABLE | STABLE | STABLE | STABLE | STABLE |
| Ex 10 | STABLE | STABLE | STABLE | STABLE | STABLE | STABLE |
| Ex 11 | STABLE | STABLE | STABLE | STABLE | STABLE | STABLE |
| Ex 12 | STABLE | STABLE | STABLE | STABLE | STABLE | STABLE |
| Ex 13 | STABLE | STABLE | STABLE | STABLE | STABLE | STABLE |
| Ex 14 | STABLE | STABLE | STABLE | STABLE | STABLE | STABLE |
| Ex 15 | STABLE | STABLE | STABLE | STABLE | STABLE | STABLE |
| Comp Ex A | STABLE | STABLE | PHASE SEPARATED | STABLE | STABLE | STABLE |
| Comp Ex B | STABLE | STABLE | STABLE | PHASE SEPARATED | PHASE SEPARATED | PHASE SEPARATED |

Coating Formulations

Prepare coating formulations by combining dispersion compositions with a binder in the following manner. Into a 100 mL glass beaker (first beaker) combine 10 g of deionized water and 5 g of isopropyl alcohol. Mix using a metal spatula. In a separate 250-mL beaker (second beaker) mix 50 g of dispersion composition and 35 g of deionized water and mix for 5 minutes using an IKA stirrer equipped with a standard 3 upper pitched blade at 800 revolutions per minute. Add the contents of the first beaker drop-wise to the second beaker while mixing. In a third beaker (100 mL beaker) add 18 g of a polyurethane dispersion binder (see Table 8) and 2 g of the contents from the second beaker. Mix the contents of the third beaker with a wooden spatula for one minute with moderate agitation to obtain a coating formulation.

The binders for these coating are selected from:
I—aliphatic polyurethane/polycarbonate based dispersion, available as PERMUTEX™ RU-13-085 binder from Stahl Polymers.
II—a blend of 80 weight-parts PRIMAL™ U-91 binder (aqueous dispersion of an aliphatic polyurethane; available from Rohm and Haas Corporation) and 20 weight-parts EASAQUA™ XD 803 binder (water-dispersible aliphatic polyisocyanate without alkyl phenol ethoxylate; available from Vecnorex, EASAQUA is a trademark of Vecnorex).

Make a reference ("Control") coating using the same procedure and Binder II without a dispersion composition.

Application of Coating

Polyester substrate.

Apply a 60 micrometer thick coating of each coating formulation onto a clear polyester plastic film using a gap applicator from BYK. Dry the coatings in a vented oven at 80° C. for 2 minutes.

Leather Substrate.

Apply two layers, each 34 micrometers thick, onto pretreated black cow leather using a gap applicator from BYK. Dry the first layer for 2 minutes at 80° C. in a vented oven for 2 minutes prior to applying the second layer. Dry the second layer for 2 minutes at 80° C. in a vented oven.

Characterization of Coating

Characterize the coatings in each of the following ways, results are in Table 7:

Appearance: compatibility of the dispersion with the binder and polyester film is evident from the appearance of the coating on the polyester film. Appearance is assigned a value of 1-5 with 1 being "defect free" and 5 corresponding to roughly half the areas being defective due to craters. A value of 1-3 is acceptable.

Abrasion Resistance: Follow ISO 17076-1:2012 method to characterize the abrasion resistance of the coating on the leather substrate using Table method—CS-10 wheal with 1 kilogram weight. Report the number of cycles the leather endures before visible wear is observed. A higher number corresponds to greater abrasion resistance and desirable.

Wet Rub: Follow ISO 26082-1 method to characterize wet rub resistant on the coating on the leather substrate using Martindale. Assign numbers according the test method in values of ΔE. Lower values are desirable.

Coefficient of Friction and Anti-Squeak: Follow VDA 230-206 method to determine coefficient of friction and anti-squeak performance for the coating on leather substrates. For the coefficient of friction use SSP-04 Test Bench from Ziegler Instruments. For squeak, a value of 1-3 indicates no stick-slip is encountered and that audible noise is not expected. A value of 4-5 indicates that stick-slip problems are possible and that audible interference cannot be eliminated. A value of 6-10 indicates that stick-slip problems will occur and that audible noise during relative movements is expected. Low values for both coefficient of friction and anti-squeak are desirable.

TABLE 8

| Dispersion | Binder | Appearance | Coefficient of Friction | Anti-squeak | Abrasion Resistance | Wet Rub Resistance |
|---|---|---|---|---|---|---|
| Control | II | 1 | Too sticky to measure | Too sticky to measure | 500 | 27 |
| Ex 1 | I | 3 | 0.1677 | 1-2 | 2000 | 1.0 |
| Ex 2 | II | 3 | 0.1017 | 2-8 | 2300 | 1.2 |
| Ex 14 | II | 1 | 0.0895 | 1-2 | 1600 | 1.1 |

Results in Table 8 indicate that the dispersion compositions of the present invention serve as slip aids when combined with binders in coating formulations.

What is claimed is:

1. A composition comprising a dispersion comprising:
(a) a polyorganosiloxane comprising at least 90 mole-percent dimethyl D units and having a viscosity of 1,000,000 centipoise or more at 25 degrees Celsius, the polyorganosiloxane being in the form of particles having an average size of 0.5 to 20 micrometers;
(b) a condensation product of:
(i) a polysiloxane resin having a weight-average molecular weight of 4,000-50,000 and having the following composition:

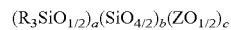

$(R_3SiO_{1/2})_a(SiO_{4/2})_b(ZO_{1/2})_c$ where subscripts a, b and c refer to the average molar ratio of the group associated with the subscript relative to total moles of silicon atoms in the molecule, subscript a is 0.30-0.60, subscript b is 0.40-0.70, subscript c is 0.05-0.20, the sum of subscripts a and b is one, R is independently in each occurrence selected from a group consisting of hydrogen, alkyl and aryl groups containing 1-30 carbon atoms, and Z is independently in each occurrence selected from a group consisting of H, and $C_1$-$C_8$ alkyls; and
(ii) a polyoxyalkylene polymer having a number average molecular weight of 4,500 Daltons or more and at the same time 50,000 Daltons or less and having the following composition:

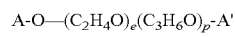

$A-O-(C_2H_4O)_e(C_3H_6O)_p-A'$ where subscripts e and p are the average number of $(C_2H_4O)$ and $(C_3H_6O)$ groups in the molecule respectively and the ratio e/p is greater than one and less than 9, A and A' are independently selected from a group consisting of hydrogen, alkyl, substituted alkyl, aryl, and substituted aryl groups provided that at least one of A and A' is H; and
(c) a non-aqueous fluid carrier that is miscible with the polyoxyalkylene polymer;
wherein the weight-ratio of non-aqueous fluid carrier (c) to condensation product (b) is 0.5 or more and 10 or less; the weight-ratio of the combination of condensation product (b) and non-aqueous fluid carrier (c) to polyorganosiloxane (a) is 0.01 or more and 0.50 or less; and the composition contains less than one weight-part aromatic solvent per million weight parts composition.

2. The composition of claim 1, wherein the condensation product (b) comprises a first non-aromatic solvent having a boiling point in a range of 50-200 degrees Celsius at 101.325 kilopascals pressure and Hansen solubility parameter values of 15.0-22.6 $(MPa)^{1/2}$ for $\delta_d$, 2.8-7.0 $(MPa)^{1/2}$ for $\delta_p$ and 4.0-7.5 $(MPa)^{1/2}$ for $\delta_h$.

3. The composition of claim 2, wherein the condensation product (b) further comprises a second non-aromatic solvent having a boiling point in a range of 50-200 degrees Celsius at 101.325 kilopascals pressure and Hansen solubility parameter values of 12.2-18.7 $(MPa)^{1/2}$ for $\delta_d$, 0.0-1.7 $(MPa)^{1/2}$ for $\delta_p$ and 0.0-3.4 $(MPa)^{1/2}$ for $\delta_h$, and a solubility of water that is less than 0.075 weight-percent based on weight of the second non-aromatic solvent.

4. The composition of claim 2 or claim 3, wherein the first non-aromatic solvent and second non-aromatic solvent have combined Hansen solubility parameter values of 15.0-16.4 $(MPa)^{1/2}$ for $\delta_d$, 2.0-6.0 $(MPa)^{1/2}$ for $\delta_p$ and 3.3-6.3 $(MPa)^{1/2}$ for $\delta_h$.

5. The composition of claim 2, wherein the condensation product (b) contains less than five weight-parts aromatic solvent per million parts condensation product weight.

6. The composition of claim 1, wherein the composition further comprises water at a concentration of up to 500 weight parts water per 100 weight parts of the polyorganosiloxane (a).

7. The composition of claim 1, wherein both the condensation product (b) and the composition are free of tin catalyst.

8. The composition of claim 1, further comprising an organic binder in combination with the polyorganosiloxane of component (a), the condensation product of component (b) and non-aqueous fluid carrier of component (c).

9. The composition of claim 1, wherein the polyorganosiloxane has a terminal amine functionality.

10. A method for preparing the composition of claim 1, the method comprising the steps of:
  (a) preparing a condensation product by conducting a condensation reaction in a reaction solvent between:
    (i) a polysiloxane resin having a weight-average molecular weight of 4,000-50,000 and having the following composition:

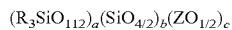
    $(R_3SiO_{1/2})_a(SiO_{4/2})_b(ZO_{1/2})_c$ where subscripts a, b and c refer to the average molar ratio of the group associated with the subscript relative to total moles of silicon atoms in the molecule, subscript a is 0.30-0.60, subscript b is 0.40-0.70, subscript c is 0.05-0.20, the sum of subscripts a and b is one, R in each occurrence is selected from a group consisting of hydrogen, alkyl and aryl groups containing 1-30 carbon atoms, and Z is in each occurrence selected from a group consisting of H, and $C_1$-$C_8$ alkyls; and
    (ii) a polyoxyalkylene polymer having a number average molecular weight of 4,500 Daltons or more and at the same time 50,000 Daltons or less and having the following composition:

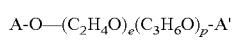
    A-O—$(C_2H_4O)_e(C_3H_6O)_p$-A' where subscripts e and p are the average number of $(C_2H_4O)$ and $(C_3H_6O)$ groups in the molecule respectively and the value of e/p is greater than one and less than 9, A and A' are independently selected from a group consisting of hydrogen, alkyl, substituted alkyl, aryl, and substituted aryl groups provided that at least one of A and A' is H;
  (b) adding to the condensation product a non-aqueous fluid carrier that is miscible with the polyoxyalkylene polymer to form a mixture;
  (c) after step (a) and before step (d), removing reaction solvent to a concentration of less than 2 weight-percent relative to condensation reaction product weight, including removing any aromatic solvent to a concentration of less than 5 weight-parts per million weight parts of condensation product;
  (d) dispersing into the mixture of step (c) a polyorganosiloxane comprising at least 90 mole-percent dimethyl D units and having a viscosity of 1,000,000 centipoise or more at 20 degrees Celsius under shear to produce a dispersion of polyorganosiloxane particles having an average size of 0.5 to 20 micrometers dispersed in the mixture of step (c) to form a composition;
wherein: the weight-ratio of non-aqueous fluid carrier added in step (b) to condensation product prepared in step (a) is 0.5 or more and 10 or less; the weight-ratio of the combination of condensation product prepared in step (a) and non-aqueous fluid carrier added in step (b) to polyorganosiloxane dispersed in step (d) is 0.01 or more and 0.5 or less; and the composition contains less than one weight-part aromatic solvent per million weight parts composition.

11. The process of claim 10, wherein the condensation reaction is run in a first non-aromatic solvent having a boiling point in a range of 50-200 degrees Celsius at 101.325 kilopascals pressure and Hansen solubility parameter values of 15.0-22.6 $(MPa)^{1/2}$ or $\delta_d$, 2.8-7.0 $(MPa)^{1/2}$ for $\delta_p$ and 4.0-7.5 $(MPa)^{1/2}$ for $\delta_h$.

12. The process of claim 11, wherein the condensation reaction is run in a non-aromatic solvent comprising a blend of the first non-aromatic solvent and a second non-aromatic solvent having a boiling point in a range of 50-200 degrees Celsius at 101.325 kilopascals pressure and Hansen solubility parameter values of 12.5-18.7 $(MPa)^{1/2}$ for $\delta_d$, 0.0-1.5 $(MPa)^{1/2}$ for $\delta_p$ and 0.0-3.4 $(MPa)^{1/2}$ for $\delta_h$ and having a solubility of water that is less than 0.075 weight-percent based on weight of the second non-aromatic solvent; wherein the blend of first and second non-aromatic solvents has Hansen solubility parameter values of 15.0-16.4 $(MPa)^{1/2}$ for $\delta_d$, 2.0-6.0 $(MPa)^{1/2}$ for $\delta_p$ and 3.3-6.3 $(MPa)^{1/2}$ for $\delta_h$.

13. The process of claim 12, wherein the condensation reaction is run in the presence of less than five weight-parts aromatic solvent per million weight parts combined weight of polysiloxane resin, polyoxyalkylene polymer and non-aromatic solvent.

* * * * *